Sept. 18, 1956   R. W. JOHNSON   2,763,120
SIDE DELIVERY RAKE
Filed Oct. 1, 1952   2 Sheets-Sheet 1
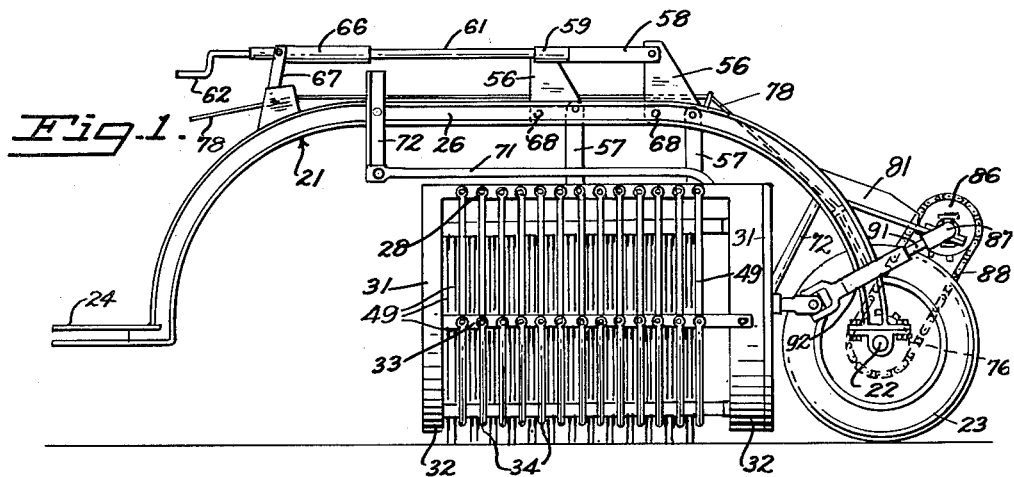
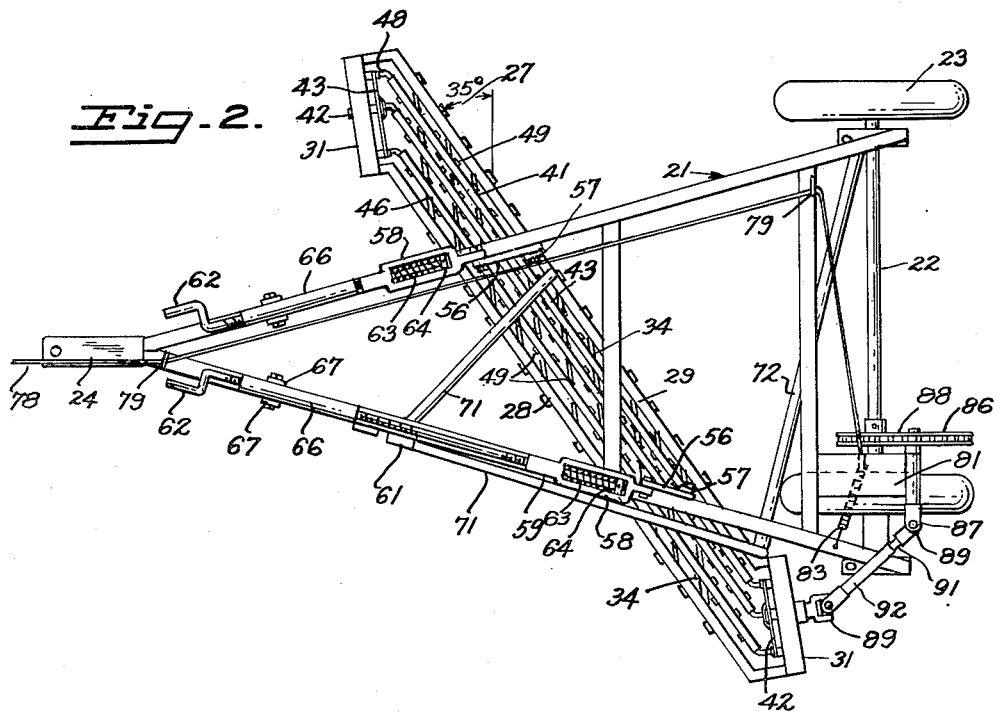
INVENTOR.
ROY W. JOHNSON
BY
Townsend and Townsend
ATTORNEYS Sept. 18, 1956

R. W. JOHNSON 2,763,120

SIDE DELIVERY RAKE

Filed Oct. 1, 1952

INVENTOR.
ROY W. JOHNSON
BY
Townsend and Townsend
ATTORNEYS 2,763,120
Patented Sept. 18, 1956

2,763,120
SIDE DELIVERY RAKE

Roy W. Johnson, Woodland, Calif., assignor to Estand, Inc., San Francisco, Calif., a corporation of Nevada Application October 1, 1952, Serial No. 312,552

4 Claims. (Cl. 56—377)

This invention relates to new and useful improvements in side delivery rakes and constitutes an improvement of my copending application Serial No. 108,092, filed August 2, 1949, now Patent No. 2,658,324. The present invention comprises a side delivery rake driven from the ground support wheels of the rake wherein the rake assembly is mounted or suspended in floating relation to the main frame so that the rake assembly may follow ground contour as the rake is pulled over a field. At the same time, controls are provided to adjust the rake assembly in a vertical direction without interfering with the floating motion.

An object of the invention is the provision of a reel so located in the frame of the rake that the raking action is substantially at a right angle to the forward travel of the rake, thus moving the hay from one end of the reel to the other more rapidly and with less agitation of the hay than where a lesser angle is employed. Reduction in agitation results in a higher nutritive value of the hay in that the leaf particles, which contain much of the nutritive value, are not as apt to be dislodged from the stem and blown away. This raking action further provides a more even windrow and less bunching of the hay.

The rake reel of the instant apparatus is revolved by a novel drive hereinafter described in greater detail, this drive operating off of one of the wheels supporting the rake frame. The drive is simpler in construction and requires fewer parts than other drives heretofore employed in side delivery rakes. Further, the power take-off from the wheel axle is close to the axle bearing, thus resulting in less strain on the axle.

Other objects of the present invention will become apparent upon reading the following specification and referring to the accompanying drawings in which similar characters of reference represent corresponding parts in each of the several views.

In the drawings:

Fig. 1 is a side elevation of the rake.

Fig. 2 is a top plan.

Fig. 3 is an enlarged fragmentary view of the rake reel and mounting in plan.

Fig. 4 is a fragmentary rear elevation.

The instant invention employs a longitudinally arched main frame 21 which, in top plan, is substantially A-shaped with the apex foremost. At its rear end the frame is mounted on a transverse axle 22 supported by a wheel 23 at either end. One of the wheels 23 is keyed to axle 22 to cause rotation thereof as the frame is pulled over the ground. Traction is accomplished through hitch 24 at the front end of the frame.

Beneath the arched part 26 of the frame is a reel frame which is supported at an acute angle in plan with respect to axle 22. As illustrated in the accompanying drawings, this angle 27 is substantially 35 degrees. The angle 27 mentioned is one of the factors producing the improved raking action which has heretofore been described. The reel frame comprises a pair of spaced, elongated, rigid frame bars 28 and 29 which are parallel to each other and are disposed at an angle with respect to axle 22 at an angle of approximately 35 degrees as aforesaid. The rearward frame bar 29 is at a lower elevation than the forward bar 28. The reel frame ends 31 are parallel to each other and are disposed, as illustrated particularly in Figs. 2 and 3, at an angle of approximately 60 degrees with respect to the longitudinal rake frame bars 28 and 29. Thus said end members 31 are at an angle of 95° with respect to the line of travel of the rake. The reel frame also carries convex guard shoes 32 at either end which assist in causing the reel frame to conform to the contour of the ground, these shoes connecting the front and rear reel frame bars 28 and 29 together. Longitudinal stripper bars 33 tie the shoes 32 at opposite ends together. Vertical stripper wires 34 extend around the front, bottom and rear of the reel frame.

Mounted by means of bearings 41 in the end plates 31 is a spindle 42 attached to reel ends 43 so that said reel ends 43 may revolve in a plane parallel to frame ends 31. Each said reel end 43 has affixed thereto four equally circumferentially spaced bearings 44 which provide mountings for the ends of reel rods 46. The reel rods are formed with elongated central sleeve portions 47 which are parallel to frame bars 29 and have crank portions 48 at each end which are disposed perpendicular to the plane of the reel ends 43 and which are rotatably mounted in the bearings 44. At spaced intervals along the sleeves 47 are a plurality of tines 49. These tines 49 are at all times maintained substantially vertical as the reel 43 ends are caused to revolve as hereinafter described. The rake tines 49 rake the hay toward the side to form a windrow parallel to the line of travel of the rake.

The reel frame is floatably suspended from the main frame 21. Thus two parallel, vertical, triangular plates 56 are pivotally connected to the main frame 21 at the right angle corners thereof. The rearwardly projecting corners of the triangular plates are pivotally connected to the upper ends of depending vertical links, 57, the lower ends of which are pivotally connected to the rearward reel frame bar 29. Each top corner of the triangular plates are connected to a horizontal yoke 58 which is, in turn, attached to horizontal, cylindrical sleeve 59. An elongated, horizontal, threaded rod 61 having a hand crank 62 at its front end passes through sleeve 59 and a helical spring 63 is placed over the rear end of said rod interposed between a collar 64 on the end of said rod and said sleeve. The forward end of rod 61 is in threaded engagement with a nut 66 fixed to an upward extension 67 of frame 21, said nut also furnishing a guide or support for said rod. It will thus be seen that by turning crank 62, rod 61 is pulled forwardly or rearwardly, thereby pivoting plate 56 about pivot 68 and through link 57 raising or lowering the reel frame with respect to the main frame. The provision of helical springs 63 between collars 64 and sleeves 59 provides a floating mounting for the reel frame permitting the reel frame to rise and fall as the rake passes over ground of uneven contour and preventing damage to the reel from unevennesses of the ground.

Arcuate, rearwardly extending support bars 71 pivotally mounted at their forward ends to a vertical bracket 72 pivotally mounted on the apex of the main frame 21 are pivotally attached to the rear reel frame bars 29 to assist in maintaining the reel frame in upright position. Proper alignment of the reel frame with respect to the main frame is controlled by horizontal guide rod 72 pivotally attached to the main frame 21 and rear reel frame bar 29.

The drive of the rake reel is from axle 22 which is keyed to one of the wheels 23 supporting the main frame 21. A sprocket 76 is mounted on said axle 22 with a clutch 77 arranged when engaged to revolve said sprocket 76 with axle 22. The clutch 77 is engaged and disengaged through a cable 78 reeved in the main frame by pulleys and guides 79 and running to the tractor where it can be conveniently controlled by the operator. A bracket 81 is fixed to main frame 21 and to this bracket is pivoted clutch arm 82, the upper end of which is attached to cable 78, with spring 83 biasing the clutch arm 82 to disengaged position. The lower end of clutch arm 82 is formed in a yoke 84 which is attached to a conventional clutch mechanism. By pulling on cable 78, clutch 77 is engaged.

Another sprocket 86 is mounted on a stub shaft 87 mounted on main frame 21. Sprocket 86 is driven by chain 88 from sprocket 76. Stub shaft 87 extends parallel to wheel axle 22 and is so elevated that it passes over the top of wheel 23 out to the side of the frame. The outer end of stub shaft 87 is connected to one end of a universal joint 89, the other end of which is connected to spindle 42 of the reel. Universal joint 89 may lengthen and shorten by reason of the connecting shaft 91 being formed with a telescoping sleeve 92 to accommodate changes in length. Thus when clutch 77 is engaged, the reel is caused to revolve as the rake is pulled over the ground. When clutch 77 is disengaged, the reel is not rotated.

I claim:

1. A side delivery rake comprising a longitudinally arched main frame, wheels supporting the rear end of said main frame, draft means at the front end of said main frame, a reel frame, means floatably suspending said reel frame from said main frame under the arched portion thereof, said reel frame being disposed at an acute angle to the line of travel of said rake, a side delivery rake reel rotatably mounted in said reel frame, a shaft mounted on said main frame, an axle mounted in said main frame and supported by said wheels and rotated by at least one of said wheels, a first sprocket on said axle adjacent one of said wheels and positioned on said axle intermediate said wheels, said shaft being parallel to, elevated with respect to, and spaced rearwardly of said axle, said shaft extending outwardly beyond the wheel to which said first sprocket is adjacent, a second sprocket on said shaft aligned with said first sprocket, a chain driving said second sprocket from said first sprocket, a clutch manually controllable to engage and disengage one of said sprockets with the rotatable member on which it is mounted, a universal joint connecting the outer end of said shaft and said rake reel.

2. A rake according to claim 1 in which said universal joint includes a longitudinally telescoping drive shaft which is expandible and contractable as said reel frame floats with respect to said main frame.

3. A side delivery rake comprising, a longitudinally arched main frame, an axle at the rear of said frame transverse to the line of traction of said rake, a wheel on said axle and supporting said rake and arranged to be rotated as said rake is drawn over the ground, a reel frame floatably mounted from said main frame below the arched portion thereof, oblique to the line of traction of said rake, a side delivery rake reel rotatably mounted in said reel frame, said reel frame including longitudinal frame bars disposed at an angle substantially 35° with respect to said axle, said rake reel including reel end members disposed at an angle of substantially 60° with respect to said longitudinal frame bars and approximately 5° with respect to said axle, the outer end of said reel end member being disposed rearwardly with respect to the inner end of said reel end member and reel rods having elongated central portions parallel to said frame bars and end crank members normal to and journalled in said reel end members, and means for driving said reel from said wheel.

4. A side delivery rake comprising, a longitudinally arched main frame, an axle at the rear of said frame transverse to the line of traction of said rake, a wheel on said axle and supporting said rake and arranged to be rotated as said rake is drawn over the ground, a reel frame floatably mounted from said main frame below the arched portion thereof, oblique to the line of traction of said rake, a side delivery rake reel rotatably mounted in said reel frame, said reel frame including longitudinal frame bars disposed at an angle substantially 35° with respect to said axle, said rake reel including reel end members disposed at an angle of substantially 60° with respect to said longitudinal frame bars at approximately 5° with respect to said axle, the outer ends of said reel end members being disposed rearwardly with respect to the inner ends of said reel end members and reel rods having elongated central portions parallel to said frame bars and end crank members normal to and journalled in said reel end members, means for driving said reel from said wheel, said last-named means including a shaft parallel to said axle and extending beyond said wheel, said shaft being driven from a point inside said wheel and extending outside said wheel, and a universal joint drive between the outer end of said shaft and said reel which drives said reel from said wheel around an angle of substantially 95° between said reel end and said axle.

References Cited in the file of this patent

UNITED STATES PATENTS

| | | |
|---|---|---|
| 1,509,840 | Martin | Sept. 30, 1924 |
| 2,162,506 | Jones et al. | June 13, 1939 |
| 2,672,005 | Hamilton | May 21, 1951 |
| 2,637,967 | McCandless et al. | May 12, 1953 |